United States Patent [19]

Provence

[11] Patent Number: 4,885,757
[45] Date of Patent: Dec. 5, 1989

[54] DIGITAL ADAPTIVE RECEIVER EMPLOYING MAXIMUM-LIKELIHOOD SEQUENCE ESTIMATION WITH NEURAL NETWORKS

[75] Inventor: John D. Provence, Mesquite, Tex.

[73] Assignee: Texas Instruments Incorporated, Dallas, Tex.

[21] Appl. No.: 57,887

[22] Filed: Jun. 1, 1987

[51] Int. Cl.[4] ............................................. H03D 1/04
[52] U.S. Cl. ...................................... 375/96; 371/43; 364/807
[58] Field of Search ...................... 375/94, 96, 103, 14, 375/12, 16, 99; 371/43; 364/807

[56] References Cited

U.S. PATENT DOCUMENTS

| | | | |
|---|---|---|---|
| 4,484,338 | 11/1984 | Clark et al. | 371/43 |
| 4,660,166 | 4/1987 | Hopfield | 364/807 |
| 4,701,936 | 10/1987 | Clark et al. | 375/14 |

Primary Examiner—Robert L. Griffin
Assistant Examiner—Marianne Huseman
Attorney, Agent, or Firm—Carlton H. Hoel; James T. Comfort; Melvin Sharp

[57] ABSTRACT

A maximum-likelihood sequence estimator receiver includes a matched filter connected to a digital transmission channel and a sampler for providing sampled signals output by the matched filter. The sampled signals are input to an analog neural network to provide high-speed outputs representative of the transmission channel signals. The neural network outputs are also provided as inputs to a coefficient estimator which produces coefficients for feedback to the matched filter. For time-varying transmission channel characteristics, the coefficient estimator provides a second coefficient output which is utilized for changing the interconnection strengths of the neural network connection matrix to offset the varying transmission channel characteristics.

39 Claims, 2 Drawing Sheets

DIGITAL ADAPTIVE RECEIVER EMPLOYING MAXIMUM-LIKELIHOOD SEQUENCE ESTIMATION WITH NEURAL NETWORKS

TECHNICAL FIELD OF THE INVENTION

The present invention relates in general to adaptive digital transmission receivers, filters and equalizers, and more particularly relates to methods and apparatus for integrating maximum-likelihood sequence estimation apparatus and neural networks with such adaptive receivers.

BACKGROUND OF THE INVENTION

The wide-spread acceptance and use of business and personal computers have spawned a renewed interest in the digital transmission of information. As a result, computer equipment and software are currently available for allowing the exchange of information between remotely located computers. This type of digital transmission can be accomplished by utilizing a standard voice-grade telephone line between the computers, and appropriate digital transmitters and receivers connected between the computers and the telephone lines. Such digital transmitters and receivers are currently available for providing the digital transmission and reception capabilities, and include, in many instances, provisions for error correction, detection and transmission line equalization to reduce and correct data transmission errors.

The voice-grade telephone line is generally used as the medium of digital transmission as it is widely available at almost any location, and is cost effective. However, because the voice-grade transmission line is essentially a pair of twisted wires, the bandwidth thereof imposes a severe restriction on the transmission rate of the digital signals. Currently, digital transmission rates of 2400 bits/second over such a line are possible, with an acceptable low error rate. For higher data transmission rates, the error rate increases to an objectionable level, primarily due to the bandlimiting characteristics of the line, as well as Gaussian noise which is superimposed on the digital signals.

Degradation of digital signals is due primarily to the bandlimiting characteristics of the transmission channel which tend to degrade the rise and fall times of the digital signals, thereby causing overlap between adjacent digital signals. When this overlap becomes significant, detectors in the receivers are unable to discriminate between the two signals. A detector error thus results, wherein the received data is tagged as being faulty and retransmission may become necessary. The same type of problems occur in digital receivers which receive free space digital transmission perturbated by signals reflected from objects. This is termed "multipath interference" and presents receiver decoding problems, in that the reflected transmissions are received a short time after the directed transmissions are received. Thus, the same signal is received by the receiver skewed in time and an erroneously decoded signal can result.

The noted problems with baseband transmissions at high data rates have been recognized, and attempts have been made to overcome the problems. For example, forward linear transversal equalizers have been integrated with digital receiver equipment in an attempt to compensate the lowpass transmission channel degradation. Matched filters are also customarily used for matching the transmission channel response o that of the digital receiver. However, while the forward linear transversal equalizer overcomes the lowpass filter problems to a certain degree, it also amplifies the Gaussian noise, and thus the noise problem becomes the predominant factor in faulty detection of the digital signals.

The linear equalizers were further improved by adding decisional feedback in an attempt to cancel the distortion caused by the lowpass filter effects of the transmission channel. Also, such equalizers were made adaptive to the transmission channel by adding a coefficient estimator which provides feedback to the matched filter and equalizer to produce dynamic corrections based upon time-varying changes of the channel or matched filter characteristics.

In 1974, it was theorized by Dr. Ungerboeck that a maximum-likelihood sequence estimation function was applicable to data transmission systems. G. Ungerboeck, "Adaptive Maximum-Likelihood Receiver For Carrier-Modulated Data-Transmission Systems", *IEEE Transactions Communication*, Vol. COM-22, pp. 624-636, May, 1974. The maximum-likelihood sequence estimation technique involves maximizing (or minimizing) an objective function. The objective function developed by Ungerboeck is too computational intensive to be of practical use. For this reason, Ungerboeck reformulated the problem in recursive form and employed the Viterbi algorithm to compute the estimate.

The Viterbi algorithm is a dynamic programming procedure. In its most general form, the Viterbi algorithm can be viewed as a solution to the problem of maximum aposteriori probability (MAP) estimation of the state of a finite-state, discrete-type Markov process observed in the presence of memoryless noise. In essence, the Viterbi algorithm determines the optimal path through a trellis structure, which defines all possible state transitions. The Viterbi algorithm significantly reduces the number of computations required to implement maximum-likelihood sequence estimation. A more detailed review of the Viterbi algorithm can be had by reference to "The Viterbi Algorithm", *Proceedings of the IEEE*. Vol. 61, No. 3, March, 1973, pp. 268-278, G. D. Forney, Jr.

As will be set forth in more detail below, the Viterbi algorithm involves a summation of a number of product terms which are carried out in an iterative sequence. Because the entire sequence of computations must be carried out for every digital bit transmitted, the time involved for each computation usually limits the transmission rate to about 2400 bits/second. Even high speed signal processors are not able to increase the computational speed sufficiently to significantly increase the data transmission rate.

Yet another approach has been taken to reduce the computational complexity of the Viterbi algorithm by reducing the transmission channel memory. Transmission channel memory is an inherent characteristic of time-varying channels, in which the channel response to a particular signal may depend on the occurrence or non-occurrence of a prior signal. It is well known that with reduced channel memory, the number of computations involved in the Viterbi algorithm can also be reduced. Attempts to reduce the channel memory typically involve pre-filtering of the input signals to reduce the speed of the digital pulses. This approach, however, is suboptimal in nature as it increases the channel noise, thereby also decreasing the signal-to-noise ratio of the received signal. Attempts have also been made to reduce the number of states in the maximum-likelihood sequence estimation trellis structure which has the effect of reducing the channel memory. This alternative is also suboptimal in nature, as a trellis structure with fewer states than required, even though such states are seldomly encountered, increases the error rate of the receiver.

From the foregoing, it can be seen that those skilled in the art have recognized the importance of basebanded digital transmission systems and have also recognized the attendant problems. Also, it is apparent that there is a constant effort, and no small effort, to improve the performance of baseband digital transmission systems such that increased transmission rates are possible. A need thus exists for a new method and structure which can compute the maximum-likelihood sequence estimation faster than the Viterbi algorithm implementaion. To avoid increasing the error rate, the new method and structure should preferably implement the maximum-likelihood sequence estimation optimally.

SUMMARY OF THE INVENTION

In accordance with the present invention, the disclosed information transmission receiver substantially reduces or eliminates the disadvantages and shortcomings associated with the prior art techniques. According to the technical advantages of the invention, a neural network is implemented in a maximum-likelihood sequence estimation (MLSE) type of receiver to provide high speed computations and thereby provide a system which is no longer computational limited. A related technique advantage is that with the implementation of the present invention, maximum-likelihood sequence estimation receivers can be utilized with digital transmission systems to achieve higher transmission rates than heretofore utilized with such type of receivers.

The MLSE receiver of the invention includes a multi-neuron network and associated circuitry connected between the output of a matched filter and the input of a coefficient estimator. The coefficient estimator provides channel coefficients, based upon the high speed neural network outputs, to the matched filter for providing a corresponding high speed matching to the transmission channel.

In the preferred form of the invention, the MLSE receiver receives the digital output from the matched filter and stores the same in a shift register. A parallel output of the shift register provides a multiple input to the multi-neuron network which produces a high speed output of the receiver, as well as an input to the coefficient estimator. For time varying transmission channels, a feedback is provided from the coefficient estimator to the neural network to change the interconnection strength of the connection matrix of the network.

The MLSE receiver of the invention may also be provided with initializing means for presetting the input states of the neural network to predetermined states before applying the output of the shift register to the input of the neural network. Multiplier circuits can also be utilized to modify the digital signals applied to the neural network to provide a higher degree of correspondence with MSLE algorithms. The output of the neural network can also be passed through a thresholding circuit to provide bipolar states of the neuron amplifier outputs to the coefficient estimator.

BRIEF DESCRIPTION OF THE DRAWINGS

Further features and advantages will become more apparent from the following and more particular description of the preferred embodiment of the invention, as illustrated in the accompanying drawings in which like references characters generally refer to the same parts or elements throughout the views, and in which.

DETAILED DESCRIPTION OF THE INVENTION

The technical advantage of the invention is that the time required to compute the maximum-likelihood estimate of a sequence of digital data symbols transmitting over a time-dispersive and time-varying channel in the presence of additive Gaussian noise is substantially reduced. Under such conditions, the digital symbols undergo varying degrees of cross-talk on a digital transmission line, where such cross-talk is a function of transmission speed and bandwidth. As will be appreciated from the ensuing description of the invention, nonlinear receivers employing maximum-likelihood sequence estimation for data detection exhibit superior error rate performance as compared with linear counterpart receivers. In order to further enhance the detection of digital data symbols, the invention provides an alternative to a recursive dynamic programming procedure, referred to as the Viterbi algorithm, for the implementation of maximum-likelihood sequence estimation. As noted above, prior works by Viterbi and Ungerboeck relate to maximum-likelihood sequence estimation in dispersive channels, but without the utilization of high-speed neural networks. As noted above, such prior techniques utilizing MLSE techniques on time-varying channels were computation intensive, and thus limiting of the transmission data rate.

With regard to a baseband synchronous data communication link utilized to transmit a sequence of numbers, herein referred to as data or information symbols, and denoted by $\{a_{i-1}, a_i, a_{i+1}\}$, such symbols can be considered independent, with each assuming one of two equally probable values. For purposes of illustration, an illustrative example is considered having symbols with amplitudes which modulate a train of pulses occurring at intervals of T to generate the transmitted waveform characterized by:

$$x(t) = \sum_i a_i p(t - iT), \qquad 1.$$

where p(t) is the pulse train and the symbol rate is 1/T symbols per second. The bit rate over the baseband channel is thus 1/T bits per second. If h(t) denotes the convolution of p(t) with the impulse response of the transmission channel, and if the channel is bandlimited such that the time duration of h(t) is greater than the pulse signaling interval T, then a signal y(t) received at the end of the channel is mathematically characterized by the following equation:

$$y(t) = \sum_k a_k h(t - kT) + n(t), \qquad 2.$$

where n(t) defines the zero-mean Gaussian noise with an autocovariance function $R_n(t)$.

Figure 1:
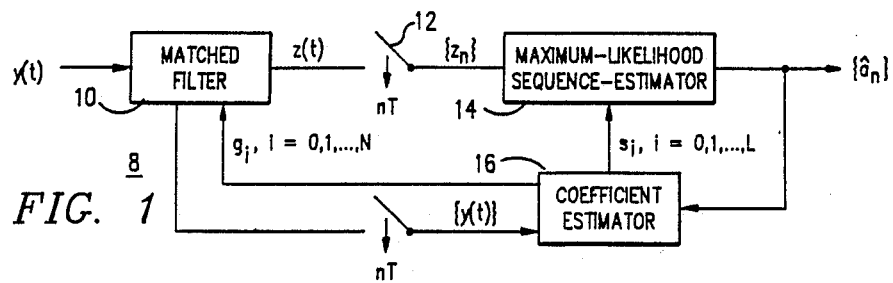
FIG. 1 illustrates in block diagram form the functional construction of an adaptive maximum-likelihood receiver.

An adaptive maximum-likelihood receiver 8 having an electrical function characterized by the foregoing equation is illustrated in FIG. 1. Such a receiver includes a matched filter 10 with an input signal y(t), an output z(t), and a second input for inputting coefficients $g_i$. The output of the matched filter 10 is switched, or sampled, as illustrated by the switch 12, once every T seconds. The sampled signal, $[z_n]$ is input to a maximum-likelihood sequence estimator 14 which provides a data symbol output $\{\hat{a}_n\}$. The output of the maximum-likelihood sequence estimator 14 is fed back to a coefficient estimator 16 which provides a first output yielding the matched filter coefficients $g_i$ and another output coupling coefficients $s_i$ to the maximum-likelihood sequence estimator 14.

The matched filter 10 is preferably provided to improve the signal-to-signal noise ratio of the receiver 8. The sequence $\{z_n\}$ input to the maximum-likelihood sequence estimator 14 is obtained by sampling the output z(t) of the matched filter 10, and processing the same by the maximum-likelihood sequence estimator 14 to produce the sequence of data symbols $\{\hat{a}_n\}$ for which the probability of the observed sequence is maximum.

Utilizing the estimated sequence, the matched filter coefficients $g_i, 0 \leq i \leq N$, and the coefficients $s_i, -L \leq i \leq L$, for the maximum-likelihood sequence estimation are estimated. The $s_i$'s account for the combined response of the transmission channel and the matched filter 10. The interger L is preferable chosen such that 2LT is the time duration of the combined response. The parameter L is defined as the transmission channel memory and is measured in units of T.

In accordance with the example, if the parameter M is the number of data symbols comprising a transmitted sequence, and if the transmission commences at time t=0 and ends at time t=MT, the adaptive receiver 8 will have as an input the signal y(t) during the time interval starting at t=0 and ending at $t=I_r$, where $I_r > (M+L)T$. With the foregoing, the maximum-likelihood receiver 8 will produce the best estimate of the sequence $\{\hat{a}_n\} = \{a_n\}$ that maximizes the likelihood function $p[y(t), 0 < t < I_r | \{a_n\}]$. Eliminating constants of proportionality, the likelihood function is defined by $$p[y(t), 0 < t < I_r | \{a_n\}] \sim \exp\left\{ -\frac{1}{2N_o} \int_0^{I_r} \int_0^{I_r} n(t_1|\{a_n\}) K_n^{-1}(t_1 - t_2) n(t_2|\{a_n\}) dt_1 dt_2 \right\}, \qquad 3.$$

where $K_n^{-1}(t)$ is the inverse of the noise autocovariance function $K_n(t)$ and $$n(t|\{a_n\}) = y(t) - \sum_{k=1}^{M} a_k h(t - kT). \qquad 4.$$

The impulse response of the matched filter 10 of FIG. 1 is defined by $$g(t) = h(-t) * K_n^{-1}(t)$$

where the * denotes the convolution function. The coefficients defining the combined response of the transmission channel and matched filter can therefore be defined as $$s_l = h(-t) * K^{-1}(t) * h(t)|_{t=lT} = s_{-l}. \qquad 5.$$

The $s_i$'s are symetric and $s_i = 0$ for $|i| > L$. By combining equations 3 and 4, and expanding the terms in the braces and identifying the appropriate terms with equation 5 results in the following:

$$p[n(t|\{a_n\})] \sim \exp\left\{ \sum_{i=1}^{m} 2a_i z_i - \sum_{i=1}^{M} \sum_{k=1}^{M} a_i s_{i-k} a_k \right\} \qquad 6.$$

In accordance with the maximum-likelihood criteria, the estimated sequence is that which is produced when the expression of equation 6 is maximized. Since the expression 6 is a monotone increasing function of the term in the braces, given by $$J_M(\{a_M\}) = \sum_{i=1}^{M} 2a_i z_i - \sum_{i=1}^{M} \sum_{k=1}^{M} a_i s_{i-k} a_k, \qquad 7.$$

then maximizing equation 6 is equivalent to maximizing expression 7. The notation $J_M(\{a_M\})$ defines a cost function for the sequence $a_1, a_2, \ldots, a_M$. Hereinafter, the expression 7 will be referred to as the MLSE cost function.

The estimation procedure utilizing the direct evaluation of the MLSE cost function requires that equation 7 be evaluated for all possible sequences of length M which can be formed from data symbols selected from an alphabet of size 2. Thus, expression 7 must be evaluated $2^M$ times to obtain an estimate of the sequence $\{a_n\}$. To perform the estimation in real time, as is required generally with most communication links, the $2^M$ computations of 7 must be performed in MT seconds. Generally, the direct evaluation of the MLSE cost function is much too computational intensive to be of practical use. However, the number of computations required can be greatly reduced by resorting the Viterbi algorithm.

Figure 2:
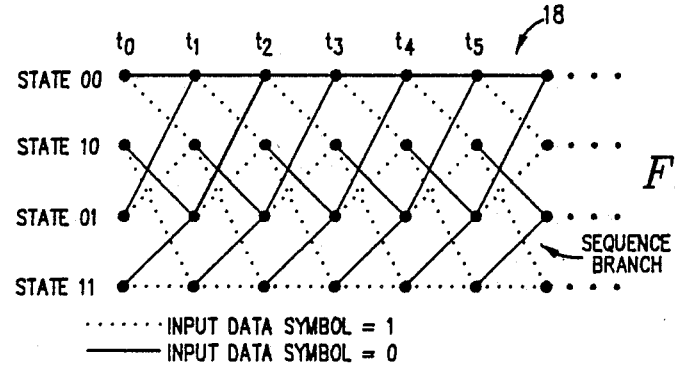
FIG. 2 illustrates a trellis structure utilized in the implementation of the Viterbi algorithm.

The Viterbi algorithm is a dynamic programming technique which can be utilized in a receiver for detecting a data sequence. Data detection is performed by ascertaining the best path through a trellis structure which defines all possible transitions through the structure, progressing from one state to another. An exemplary trellis structure 18 illustrated in FIG. 2 depicts a binary symbol alphabet with a state sequence of length two. At any discrete time, $t_i$, there are four distinct states corresponding to the four possibilities of sequences formed from two binary digits. The states are designated as binary symbols 00, 10, 01 and 11. The paths between the states indicate valid state transitions as a function of the input data. The algorithm involves the calculation of a metric (measure of similarity) between the received signal and all possible trellis paths entering each state at time $t_i$. For each state, the path with the best metric is retained, which path is commonly referred to as the survivor path. A corresponding metric is called the state metric or survivor metric. The possible paths taken by "0" data symbols are shown in solid line, while the possible data paths taken by "1" data symbols are shown in dotted lines.

A state transition metric is associated with each possible state transition from time $t_{i-1}$ to time $t_i$. In some instances, the state transition metrics are time invariant and can be computed and stored in a table before initiating the algorithm. In other situations, such as in adaptive Viterbi receivers, the state transition metrics are time-varying and thus must be computed during each discrete interval of time. In either event, the algorithm proceeds through the trellis structure 18, computing and updating the state metrics and survivor path for each state at time $t_i$, $i=0,1,2,\ldots M$. Upon termination at time $t_M$, the sequence corresponding to the best path through the trellis 18 is the estimated sequence.

The disclosure hereof is believed to be the first instance in which neural network structures have been integrated with adaptive receivers as an alternative to Viterbi algorithm techniques. The advantages of the invention can be better understood by examining the Viterbi algorithm, which is currently used to perform MLSE. Equation 7 can be expanded as follows:

$$J_M(\{a_M\}) = \sum_{i=1}^{M-1} 2a_i z_i - \sum_{i=1}^{M-1}\sum_{k=1}^{M-1} a_i s_{i-k} a_k - 2a_M z_M + a_M^2 s_0 + 2a_M \sum_{i=M-L}^{M-1} a_i s_{M-i}. \qquad 8.$$

The first two terms of the foregoing function are representative of the MLSE cost function identified above in equation 7. It is also important to note that the last three terms of the foregoing function are a function of only $\{a_{M-L}, a_{M-L+1}, \ldots a_M\}$ and not the remaining part of the possible transmitted sequence of symbols. Also, these terms depend only upon the output $z_M$ of the matched filter 10. Rewritten in recursive form, the foregoing function can be presented as follows:

$$J_M(\{a_M\}) = J_{M-1}(\{a_{M-1}\}) - 2a_M z_M + a_M^2 s_0 + 2 \qquad 9.$$

$$a_M \sum_{i=M-L}^{M-1} a_i s_{M-i}.$$

If it can be considered that the state on $\sigma_n$ determined by the vector of the data symbols can be represented by $$\sigma_n = (a_{n-L+1}, a_{n-L+2}, \ldots, a_n), n=L,L+1,\ldots,M$$

where $a_i$ is the $i^{th}$ received data symbol chosen from an alphabet of size 2. If the received data symbol at time $t_{n+1}$ is $a_{n+1}$, then the state $\sigma_n$ thereof goes to state $\sigma_{n+1}$, which is given by the vector $$\sigma_{n+1} = (a_{n-L+2}, a_{n-L+3}, \ldots, a_{n+1})$$

It can be appreciated that there is a one-to-one correspondence between the sequence of state vectors $\{\sigma_L, \sigma_{L+1}, \ldots \sigma_M\}$ and the sequence of transmitted data symbols $\{a_1, a_2, \ldots a_M\}$. Thus, there is unique sequence of state vectors $\{\sigma_n\}$ which corresponds to the sequence of data symbols $\{a_n\}$ which optimize the MLSE cost function. Estimating the optimum sequence of states can be viewed as selecting an optimum path through a trellis structure 18 comprising the associated possible states. An objective function previously derived by Ungerboeck takes the recursive form of the MLSE cost function of equation 9 into consideration with the foregoing, to yield the following objective function:

$$\tilde{J}_n = 2a_n z_n + \max_{\sigma_{n-1} \to \sigma_n} \{\tilde{J}_{n-1} - F(\sigma_{n-1},\sigma_n)\}, \qquad 10.$$

where $J_n$ is defined as the state, or survivor metric, for state $\sigma_n$. It is understood that ideally, there are as many state metrics as there are possible states in the system. The state transition metric, which is considered to assume real values, and as denoted by $F(\sigma_{n-1}, \sigma_n)$ is expressed by the following:

$$F(\sigma_{n-1}, \sigma_n) = a_n^2 s_0 + 2a_n \sum_{i=1}^{L} s_i a_{n-i}. \quad 11.$$

As noted above, at each sampling instant nT, the state metric must be calculated for all possible state $\sigma_n$. In like manner, a computation of equation 10 must be undertaken for each state at time $t_n$. For the case of binary transmission, the data symbol alphabet size is two and the total number of distinct states is seen to be $2^L$. Thus, a processor, or similar machine, must compute the expression 10, $2^L$ times during each signaling interval T. In practice, the most computational demanding part of the expression 10 is the term in the minimization brackets, namely:

$$\tilde{J}_{n-1} - F(\sigma_{n-1}, \sigma_n) = \tilde{J}_{n-1} - a_n^2 s_0 - 2a_n \sum_{i=1}^{L} s_i a_{n-i} \quad 12.$$

which must be computed $2^{L+1}$ times during time interval T. For communication systems with large channel memories, the time required to perform these computations severely limits the maximum data rate at which such systems can operate.

Techniques for reducing the number of system states have been considered in the literature. Qureshi and Newhall have proposed a pre-filtering technique which reduces the spread of the signal pulses. The combined effect of the prefilter and the channel is a reduction of the channel memory L. However, that approach is inherently suboptimal since additive noise is enhanced. The prior art also reveals that Vermeulen and Hellman defined a states reduction technique in which only the most probable states are retained as the algorithm is carried out.

Figure 3:
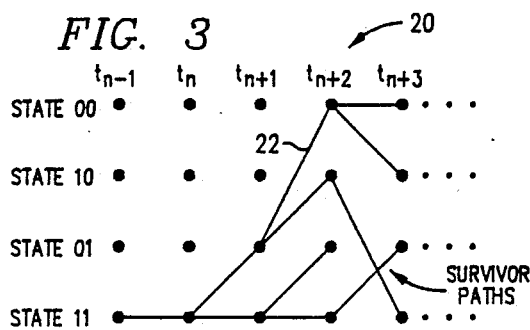
FIGS. 3 and 4 illustrate trellis structures showing the merged states of a number of survivor paths for the cases of minimum and non-minimum time merges respectively.

One of the inherent shortcomings of the Viterbi algorithm is the decision delay in the receiver system. In considering the trellis diagram 20 of FIG. 3, where only the survivor paths 22 are shown, it can be observed that the four survivor paths leading to the states at time $t_{n+2}$ each pass through a common state (11) at time $t_n$. This common state 24 is known as a merge point of the trellis structure 20. Any event occurring subsequent to time $t_n$ does not alter matters happening before time $t_n$. In this case, the decision delay comprises two signaling intervals, which delay is the smallest possible delay. Again, the minimum decision delay is generally defined by the channel memory L.

Figure 4:
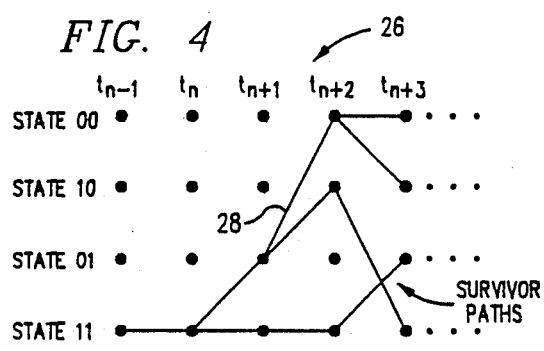

FIG. 4 illustrates another example 26 of a metric state merge. Here, the survivor paths 28 leading to the states at time $t_{n+3}$ merge to the state (11) at time $t_n$. Thus, the decision that $a_{n-1}=1$ and $a_n=1$ can be made at time $t_{n+3}$. As noted, the merge occurring at this time does not occur at a minimum. In practice, the decision delay time in a receiver utilizing the Viterbi algorithm is a random variable. Also, it is possible that no merges occur whatsoever, in which event no decisions can be made until the entire symbol sequence is transmitted.

Some versions of the Viterbi algorithm incorporate a merge decision algorithm. The advantage of detecting merges in a trellis structure, aside from reducing decision delay, is that the survivor path histories prior to the merge need not be stored or considered. Hence, a reduction in the amount of memory required can be made. However, the additional computations needed to detect merges are often too costly to justify the savings in memory reduction. An alternate technique is to choose a fixed decision delay which is sufficiently long to assure, with a high degree of probability, that merges will occur before the fixed decision delay time.

The foregoing is set forth as background for facilitating the understanding and the appreciation of the advantages of implementing maximum-likelihood sequence estimation with neural network structures. Neural networks, such as the type described by J. J. Hopfield, have properties which are highly useful in certain classes of difficult, but well-defined optimization problems, for producing solutions in very few neural time constants.

Figure 6:
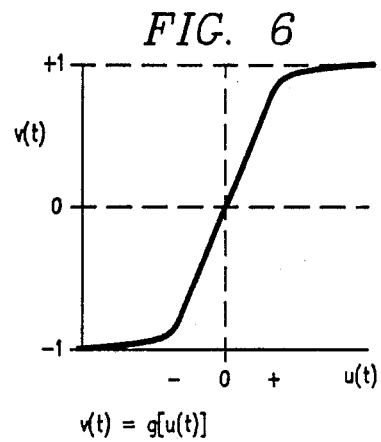
FIG. 6 illustrates the transfer characteristics desirable of an active neural network element.

The present invention is concerned with neural network implementation for maximum-likelihood sequence estimation in digital transmission receivers. Compared to current practice, the neural network implementation significantly reduces the computation time, the amount of storage memory, and the decision delay for the maximum-likelihood sequence estimation receiver. An exemplary neural network 30 of FIG. 5 includes a number of electrical neuron circuits 32 and 34 arranged together in a massively connected network for providing a high degree of distributed processing among the network elements. In the preferred form of the invention, the neurons 32 and 34 comprise analog amplifiers 36 and 38 with nonlinear input-output transfer functions, as shown in FIG. 6. It will be described in detail below the significance of a fast transition from one output state of the amplifiers 36 and 38 to the other.

Figure 5:
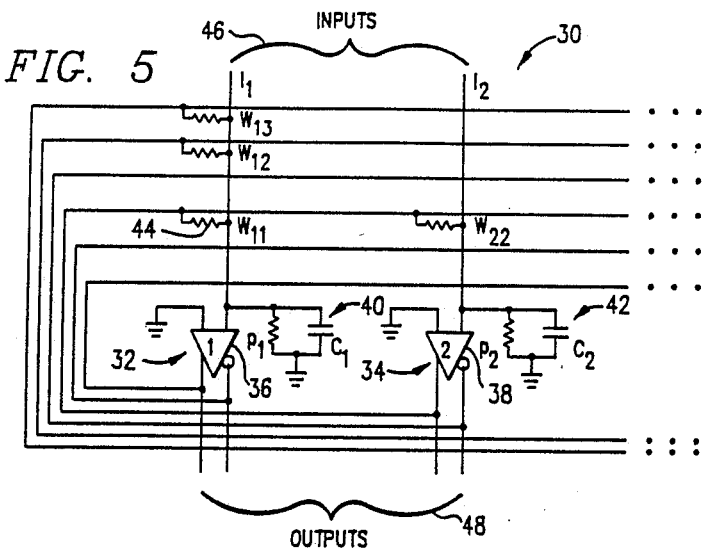
FIG. 5 illustrates a neural network implementation according to Hopfield and Tank models.

FIG. 5 illustrates a two-neuron neural network 30 utilizing such type of analog amplifiers 36 and 38. In practice, neural networks would be characterized by many more neurons than shown, and thus many more amplifiers. The network 30 is constructed utilizing analog amplifiers 36 and 38 having respective noninverting and inverting outputs, as well as inverting and noninverting differential inputs. One input of each amplifier 36 and 38 is connected to ground, while the other input is connected to a respective resistor-capacitor network 40 and 42. Connected in parallel with the resistor-capacitor network, the input of each amplifier 36 and 38 is connected by feedback resistors, such as resistor 44, to the outputs of other amplifier neurons. A group of inputs 46 define the input to the neural network 30, while a group of outputs 48 from the respective amplifiers 36 and 38 define the output of the neural network 30. The feedback resistors 44 define interconnection weights $W_{ik}$, which are defined as the conductances of a feedback connection between the output of amplifier k and the input of amplifier i.

The RC network 40 or 42 connected between the input of each amplifier and ground provides for integration of the summation of analog input circuits driving the respective amplifier neurons. As noted above, the RC networks 40 and 42 connected between the inputs and ground of the respective amplifiers 36 and 38 provides an integration of the summation of analog circuit inputs to each such amplifier. Because of the multiple input inconnections of each amplifier 36 and 38, the input circuits thereto include components resulting from the self-feedback of the amplifier, as well feedback circuits from the other amplifiers in the neural network 30. In addition, the input circuit to each amplifer neuron 32 and 34 include a component due to the circuit externally input to the neural network. The dynamics of a neural network having neurons of the type described can be characterized according to the following equation.

$$C_i \frac{du_i(t)}{dt} = \sum_{k=1}^{M} W_{ik}v_k(t) - \frac{u_i(t)}{R_i} + I_i, i = 1,2,\ldots,M; \quad 13.$$

where $v_i(t)=g_i[u_i(t)]$ and $R_i$ is the parallel combination of $p_i$ and the inconnection strengths $W_{ik}$. If $g_i=g$, $R_i=R$, and $C_i=C$ are independent of i, then equation 13 can be rewritten according to the following. After redefining $W_{ik}=W_{ik}/C$ and $I_i=I_i/C$ $$\frac{du_i(t)}{dt} = \sum_{k=1}^{M} W_{ik}v_k(t) - \frac{u_i(t)}{\tau} + I_i, i = 1,2,\ldots,M; \quad 14.$$

where $\tau=RC$. It is well known that a sufficient condition for a neural network to converge to stable output states is that the inconnections remain symmetric, i.e., $W_{ik}=W_{ki}$. Furthermore, with high-gain neural network active devices where the output transitions of the analog amplifiers are fast, the stable states of the network with such neurons comprise the local minimia of the following function:

$$E = \sum_{i=1}^{M} v_i(t)I_i - \frac{1}{2} \sum_{i=1}^{M} \sum_{k=1}^{M} v_i(t)W_{ik}v_k(t). \quad 15.$$

In other words, when the amplifier gain is high, the minima occur only at the corners of an M-dimensional hypercube defined by $v_i=+1$ or $-1$. The foregoing equation 15 comprises a Lienoponoff function of the neural network, defining an energy function.

The utilization of a neural network 30 in connection with maximum-likelihood sequence estimation techniques can be realized by minimizing the cost function repeated below, $$\tilde{J}(\{a_n\}) = -\sum_{i=1}^{M} 2a_i z_i + \sum_{i=1}^{M} \sum_{k=1}^{M} a_i s_{i-k} a_k \quad 16.$$

subject to the condition that $a_i \in \{-1, +1\}$. The known quantities comprise the $z_i$ and $s_{i-k}$. The terms $a_i$ which minimize the expression are unknown. In comparing the latter two expressions, 15 and 16, and equating the variables such that $2z_i=I_i$, $-2s_{i-k}=W_{ik}$ and $a_i=v_i(t)$, it is noted that the two functions are identical when using the identities substituted therein.

Again, when a high amplifier gain is utilized, the minimia can only occur at the corners of the M-dimensional hypercube defined by $v_i=+1$ or $-1$. In addition, it is to be noted that the MLSE expression is minimized subject to the constraint that $a_i \in \{-1, +1\}$. As noted above, if $W_{ik}=W_{ki}$, and high gain amplifiers are utilized, the network will converge to stable states, wherein $v_i=+1$ or $-1$. Since $s_i=s_{-i}$, and $W_{ik}=-2s_{i-k}=-2s_{k-i}=W_{ki}$, the synaptic interconnection symmetry condition is maintained. Thus, when utilizing high gain amplifiers as active neuron elements of the network, the minimization constraint for the MLSE function is satisfied.

The synaptic interconnections 44 for the neural network implementation 30 are determined by the coefficients which describe the combined response of the channel and the matched filter 10. The synaptic connection matrix for the neural network 30 is illustrated below, with W denoting a matrix of multiple synaptic connections $W_{ik}$. The non-zero terms denote the coefficients defining the channel.

$$W = \begin{bmatrix} -2s_0 & -2s_1 & \cdots & -2s_L & 0 & 0 & 0 & \cdots & 0 \\ -2s_1 & -2s_0 & -2s_1 & \cdots & -2s_L & 0 & 0 & \cdots & 0 \\ -2s_2 & -2s_1 & -2s_0 & -2s_1 & \cdots & -2s_L & 0 & \cdots & 0 \\ \cdot & \cdot & \cdot & \cdot & \cdot & \cdot & \cdot & & \cdot \\ \cdot & \cdot & \cdot & \cdot & \cdot & \cdot & \cdot & & \cdot \\ \cdot & \cdot & \cdot & \cdot & \cdot & \cdot & \cdot & & \cdot \\ 0 & \cdots & 0 & 0 & 0 & -2s_L & \cdots & -2s_1 & -2s_0 \end{bmatrix}_{M \times M}$$

Figure 7:
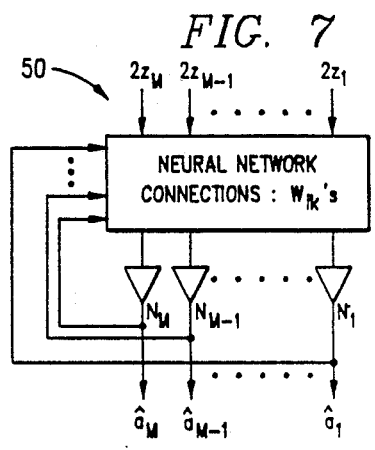
FIG. 7 is a simplified schematic diagram of the implementation, of a neural network in a maximum-likelihood sequence estimation circuit.

The current input to each neuron (defined as $I_i$) is determined as result of the input stimulus $z_i$, $1 \leq i \leq M$. With an input voltage $v_i(t)$ initially at zero, an input symbol sequence is applied to the network. After the neural network settles, an estimated sequence $\{a_n\}$ is taken from the output of the amplifiers. FIG. 7 is illustrative of a neural network 50 which can be utilized in connection with the MLSE function. Initial conditions can be applied to the input of the neural network 50 by setting switches 66 to positions zero prior to the application of a sampled digital signal $\{z_n\}$ to improve the performance of the network 50. In response to the initial conditions, and after the output of the neural network 50 has settled, which is generally within about five neural time constants, an input sequence of digital symbols $Z_1 \ldots Z_M$ can be applied to the network 50 and the output thereof processed in a manner to be described in more detail below. The analyzation of MLSE functions set forth above in connection with neural networks assumes that the transmission channel is of the stationary type, i.e., the type in which the channel coefficients $s_i$ described, and the combined channel and matched filter response do not change with time. Because time-varying transmission channels are routinely encountered more often than stationary channels, the MLSE function identified above by equation 5.4 can be rewritten below in terms of a time-varying channel.

$$\tilde{J}(\{a_n\}) = -\sum_{i=-N}^{N} 2a_i z_i + \sum_{i=-N}^{N} \sum_{k=-N}^{N} a_i s_{i-k}^{(i)} a_k, \quad 17.$$

where $s_{i-k}(i)$ denotes the value of $s_{i-k}(i)$ at the time the $i^{th}$ observation, $z_i$ was sampled. The time-varying coefficients are generally not symmetric, so it follows that $$s_{i-k}^{(i)} \neq s_{i-k}^{(j)} \; i \neq j$$

As can be seen, a symmetrical condition of the coefficients no longer exists, whereupon such coefficients must be constantly reformulated. Also, with the interconnection strengths of the time-varying channel identified as follows:

$$W_{ik} = s_{i-k}^{(i)} \neq s_{k-i}^{(k)} = W_{ki} \; i \neq k$$

the symmetrical condition sufficient for stability no longer exists. However, the following expression is applicable for reformulating the synaptic interconnections to provide a symmetrical relationship thereof in the neural network.

$$\sum_{i=1}^{M} \sum_{k=1}^{M} a_i s_{i-k}^{(i)} a_k \quad 18.$$

If $\alpha$ and $\beta$ are two integers between 1 and M, and if $\alpha$ does not equal $\beta$, but if in equation 18 two of the terms in the summation are considered, one for $i=\alpha$, $k=\beta$ and the other for $i=\beta$, $k=\alpha$, the result is given respectively by $$a_\alpha s_{\alpha-\beta}^{(\alpha)} a_\beta \; \& \; a_\beta s_{\beta-\alpha}^{(\beta)} a_\alpha$$

For the indices $\alpha$ and $\beta$, the summation can be transformed into the following:

$$a_\alpha s_{\alpha-\beta}^{(\alpha)} a_\beta + a_\beta s_{\beta-\alpha}^{(\beta)} a_\alpha = \frac{1}{2} a_\alpha a_\beta (s_{\alpha-\beta}^{(\alpha)} + s_{\beta-\alpha}^{(\beta)}) + \frac{1}{2} a_\alpha a_\beta (s_{\beta-\alpha}^{(\beta)} + s_{\alpha-\beta}^{(\alpha)}).$$

The two terms on the right hand side of the equation are identical and define new modified channel coefficients $\acute{s}_{i-k}$ such that $$\acute{s}_{i-k} = \frac{1}{2}(s_{i-k}^{(i)} + s_{k-i}^{(k)}). \quad 19.$$

As can be appreciated, the new modified coefficients are symmetrocal in that $\acute{s}_{i-k} = \acute{s}_{k-i}$. Also, when $i=k$, the new modified coefficients become $$\acute{s}_{i-i} = \frac{1}{2}(s_{i-i}^{(i)} + s_{i-i}^{(i)}) = s_0^i$$

which produces the main diagonal entries in the connection matrix. If $s_{i-k}^{(i)} = s_{k-i}^{(i)}$, then expression 19 reduces to the stationary channel case. From the foregoing, the MLSE function can be written with symmetrical channel coefficients $\acute{s}'_i$ in a general form descriptive of either a stationary or time-varying channel. The following expression is illustrative $$\tilde{J}(\{a_n\}) = -\sum_{i=1}^{M} 2a_i z_i + \sum_{i=1}^{M} \sum_{k=1}^{M} a_i \acute{s}_{i-k} a_k, \quad 20.$$

where the $\acute{s}_{i-k}$'s are given by expression 19. When utilizing the MLSE function for time-varying channel, the parameters for the MLSE network are given by:

$$2z_i = I_i, \; -2\acute{s}_{i-k} = -(s_{i-k}^{(i)} + s_{k-i}^{(k)}) = W_{ik}, \; a_i = v_i(t).$$

Figure 8:
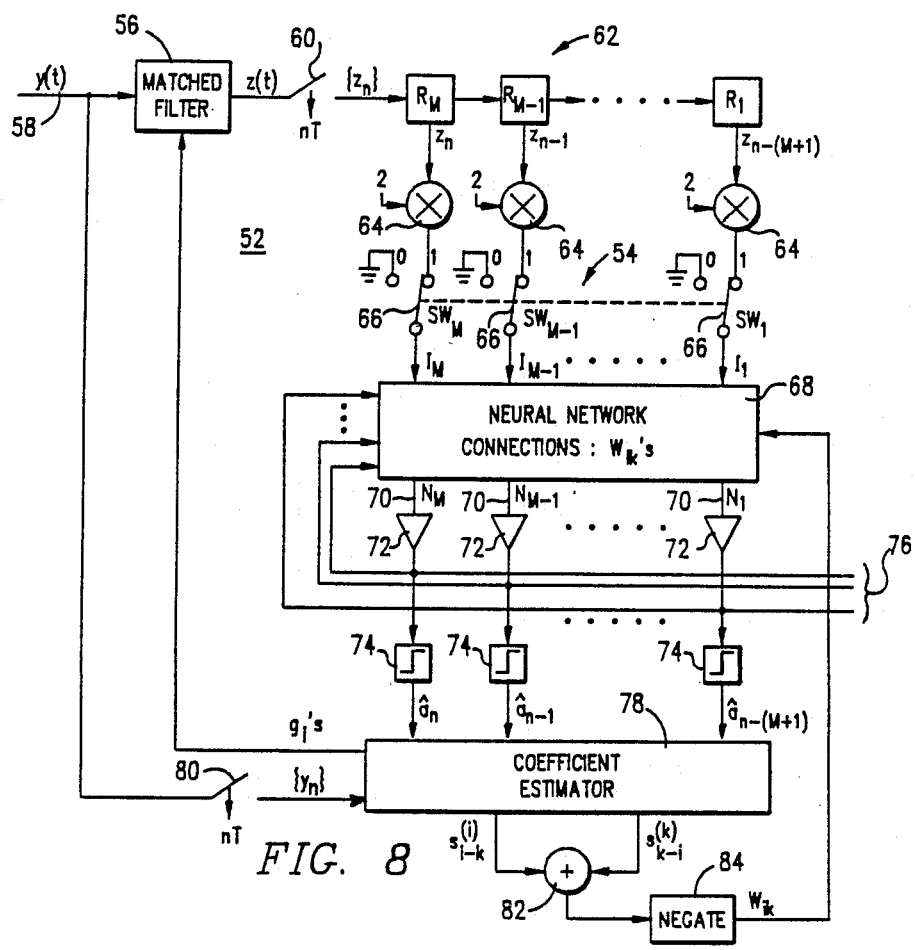
FIG. 8 is a detailed schematic illustration of the neural network maximum-likelihood adaptive receiver of the invention.

FIG. 8 illustrates an MLSE adaptive receiver 52 employing a neural network 54. Particularly shown is a matched filter 56 with an input connected to a time-varying transmission channel 58. The output of the matched filter 56 produces a signal z(t) which is sampled, as illustrated by a switch 60, at intervals nT. In practice, the switch 60 comprises an analog-to-digital converter and a sample and hold amplifier.

A sampled symbol sequence $\{z_n\}$ is input to a shift register 62 having M stages. In the preferred form of the invention, the samples are characterized by eight bits. Other sampled word lengths may be utilized. As can be appreciated, an eight bit bus connects the shift register stages together, as well as to the sampling switch 60. After M samples are received and shifted into the multistage shift register 62, register stage $R_1$ will contain the first sample, $R_2$ will contain the second sample, and so on. The output of each stage of the shift register 62 is coupled to a respective multiple-by-two circuit 64. In addition, each shift register stage provides a full eight bit work to the respective multiply circuits 64. The output of each multiple-by-two circuit 64 is connected to a switch 66 which functions to apply initial conditions to the input of the connection matrix 68, and then to apply the output of each multiple-by-two circuit to such matrix 68. The switches 66 may in practice comprise analog switches operating in timed manner to present initial conditions to the neural network 54 for a predetermined period of time, and then apply the stored symbols $\{z_n\}$ of the sequence. Also, in practice, digital-to-analog converters are connected between the switches 66 and the neural network 68 to provide analog inputs to such network. Those skilled in the are may find it advantageous to also implement the multiply function within the digital-to-analog converters.

The initial conditions applied to the neural network 68 via the switches 66 precondition the state of the network 68 before the multiplied shift register outputs are applied to the network 68. Thus, once a new sequence of data words are shifted into the shift register 62, the switches 66 are operated from the zero positions to the one positions. Also, the shifting of data words through the shift register 62 may be overlapped. That is, on a first shift the word may be temporarily stored in register stage $R_m$, and in the next shift the same word may be temporarily stored in stage $R_1$.

The connection matrix 68 has a number of outputs 70 coupled to respective analog amplifiers 72 of the neural network 54. The output of the analog amplifiers 72, or neurons, are connected in parallel back to the input of the connection matrix 68, as well as to the input of a number of thresholding devices 74. The thresholding devices 74 provide a definitive state (+1 or −1) of the output of the respective neuron amplifiers 72. The output of each thresholding device 74 is input to a coefficient estimator 78. Coefficient estimators utilized in conjunction with digital receivers are well known in the art and thus need not be further detailed. The sequence of the transmitted symbols carried by the channel 58 are also sampled by a second illustrative switch 80, at a sampling rate 1/T, and provided as an input $[y_n]$ to the coefficient estimator 78. In turn, coefficients $g_i$ are output from the coefficient estimator 78 to the matched filter 56. The coefficient estimator 78 provides the coefficients $s_i$'s to an adder 82 which functions to add the coefficients in the manner specified by the equation stated above. The output of the adder 82 is connected to a negate circuit 84 which provides an output $W_{ik}$ which is the negative of the input thereof. The output of the negate circuit 84 is applied back to the neural network connection matrix 68.

For time-varying characteristics of the transmission channel 58, the coefficients $W_{ik}$ output by the negate circuit 84 are effective to modify or change the connection strengths of the neural network 68 to offset the time-varying channel characteristics. While the connections of the neural network matrix are illustrated as resistors in FIG. 5, in practice such connections could be switched capacitors or other devices for switchably interconnecting different resistances or conductances between the network interconnections.

In operation, the shift registers R1, R2, ... $R_M$ temporarily store the M observations of the symbol sequence $\{z_n\}$. With all amplifier inputs $u_i$, i=1, 2 ... M initially set to a zero value, switches $s_{wi}$, i−1, 2 ... M are simultaneously closed for a time sufficient to allow the output of neural network 54 to settle to a stable state. The output of each neural amplifier 72 is applied to the input of the threshold devices 74 which outputs a +1 or −1 for a positive or negative input respectively. Once the network 54 has settled, the estimated sequence is read at the output of the threshold devices 74, as shown in FIG. 8

In some situations, the length of the network, M, is considerably less than the total number of data symbols comprising a transmitted sequence $\{z_n\}$. If, for example, the transmitted sequence comprises KM data symbols, and assuming a stationary channel, it is possible to load a first set M of observations into the shift register 62 and estimate the corresponding data symbols. After such estimate has been accomplished, a second set of data symbols would be loaded into the shift registers and processed by the neural network 54, whereupon a second set of data symbols would be estimated. This procedure would be performed a total of K times to obtain an estimate of the entire transmitted sequence. With this procedure of processing discrete segments of the symbol pulse train, the truncation of observed sequences is not taken into account.

The effect of the truncation can be illustrated by considering the role of the observations in the foregoing estimation. If $z^{(k)}, 1 \leq k \leq M$ denotes an observation applied to the external input of neural amplifier k, where $z^{(k)}$ is the $i^{th}$ observation from the received sequence and if the channel memory is L, all information concerning the identity of a data symbol $a_i$ is contained in the observations:

$$z_{i-L}^{(k-L)}, z_{i-L+1}^{(k-L+1)}, \ldots, z_{(i+L)}^{(k+L)}$$

For a k in the interval defined by $L < k < M-(L-1)$, all the observations containing information about the data symbol estimated by neural amplifier k are available to the network. On the other hand, for k in the interval $1 \leq k \leq L$ and $M-L \leq k \leq M$, various of the observations containing information about the data symbol estimated by the neural amplifier k are not available to the network.

Therefore, it is likely that more errors would be incurred in estimating $\hat{a}^{(k)}$ for k in the intervals defined by the foregoing expression, than in the interval defined by the immediately preceding expression. The overlap problem can be treated for each iteration of the estimation. If a set of M observations have been received, and the neural network 54 has produced a set of M data symbol estimates, all such estimates are not considered as valid. Rather, only estimates from neurons L+1 through M−L are presumed valid. As can be realized, this corresponds to estimates which are based upon complete information about the symbols being estimated. From this, the set of observations in shift registers M, M−1, ... M−p are saved, where $2L \leq p \leq M-1$.

A new set of p observations are then shifted into the shift register 62 and the neural network 54 performs an additional estimation. Essentially, this procedure is tantamount to shifting in p rather than M new observations after each estimation cycle. Estimations of the $s_i$'s and the $g_i$'s in a decision-directed mode requires that data symbol estimates be available to the coefficient estimator 78. At time $t_n$, the coefficient estimation technique described above requires that $$\hat{a}_{n-L}, \hat{a}_{n-L+1}, \ldots, \hat{a}_{n+L}$$

be available to estimate the terms $s_i^{(n+1)}$'s and $g_i^{(n+1)}$'s. However the network 54 has computed valid estimates for data symbols only up to the terms $a_{n-L}$. Thus, there is a delay in the coefficient estimation procedure. The delay interval should be small enough to assure that the channel characteristics do not change significantly during the delay time interval. The decision delay for the MLSE neural network is 2L signaling intervals. If non-valid estimates are included in the coefficient estimation, then the decision delay is reduced to L.

From the foregoing, there is disclosed a method and apparatus for implementing a neural network into a maximum-likelihood sequence estimation receiver. By sequentially shifting sampled data symbols through the input of a multiple-input neural network, an output thereof comprises state signals for input to a coefficient estimator. The coefficient estimator provides coefficient information to the matched filter of the channel, as well as feedback information for varying the connection strengths of the neural network matrix. As a consequence, a computational intensive processor is not required to carry out the algorithms for effecting the maximum-likelihood sequence estimation technique for detecting transmitted digital data streams. Rather, a neural network is integrated with a matched filter and a coefficient estimator to provide high-speed processing for achieving the maximum-likelihood sequence estimation results.

While the preferred embodiment of the invention has been disclosed with reference to a specific method and apparatus, it is to be understood that many changes in detail may be made as a matter of engineering choices without departing from the spirit and scope of the invention, as defined by the appended claims.

What is claimed is:

1. A digital receiver for maximum-likelihood sequence estimation of digital signals transmitted over a time-dispersive transmission channel, comprising:
   a matched filter with an input for receiving signals transmitted over the transmission channel; and
   a neural network for receiving sampled signals output by said matched filter and for providing output signals of said receiver which are estimates of signals initially transmitted over said transmission channel.

2. The receiver of claim 1 further including a coefficient estimator for receiving digital signals output by said neural network and for producing coefficient information for input back to said neural network to modify feedback connection strengths of said neural network.

3. The receiver of claim 2 further including a thresholding device connected between the output of said neural network and said coefficient estimator, said thresholding device being operative to produce as an output thereof a first state or a second state from an analog signal output by said neural network.

4. The receiver of claim 2 further including a logic circuit connected to the output of said coefficient estimator and to said neural network for providing changes in interconnection strengths within said neural network for time varying channel characteristics.

5. The receiver of claim 4 wherein said logic circuit comprises an adder and a negate circuit.

6. The receiver of claim 2 further including a sampler for sampling signals carried by said channel and inputting said sampled signals to said coefficient estimator.

7. The receiver of claim 1 wherein said neural network comprises an analog circuit having a number of high gain amplifiers.

8. The receiver of claim 1 wherein said neural network includes M inputs, and further including an N-bit storage register for storing digital information output by said matched filter for input to respective M inputs of said neural network.

9. The receiver of claim 1 further including a switch connected to the input of said neural network for momentarily switching said input to a reference to precondition said neural network to predefined states.

10. The receiver of claim 1 further including a multiplier for multipling the digit information applied to the inputs of said neural network.

11. The receiver of claim 10 wherein said multiplier comprises a multiply-by-two circuit.

12. A digital receiver for maximum-likelihood sequence estimation of digital signals transmitted over a time-dispersive transmission channel, comprising:
    a matched filter with an input for receiving signals transmitted over a transmission channel; and
    a network for carrying out neural type of function for receiving sampled signals output by said matched filter and for minimizing a cost function according to an expression $$J(\{a_n\}) = -\sum_{i=1}^{M} 2a_i z_i + \sum_{i=1}^{M} \sum_{k=1}^{M} a_i s_{i-k} a_k$$

for generating a sequence of data symbols representing a maximum-likelihood estimation of the transmitted sequence, where $a_i$ are the digital signals transmitted, $z_i$ are sampled output of the matched filter, and $s_k$ are the coefficients for the maximum-likelihood sequence estimation.

13. The digital receiver of claim 12 wherein said network comprises a digital simulation of an analog neural network.

14. The digital receiver of claim 12 wherein said network comprises an analog neural network.

15. The digital receiver of claim 12 wherein said network includes means for performing digital and analog functions.

16. The digital receiver of claim 15 wherein said means for performing digital functions comprises means for changing interconnection strengths of a neural network.

17. The digital receiver of claim 15 wherein said means for performing analog functions comprises a nonlinear amplifier.

18. A digital receiver for maximum-likelihood sequence estimation of digital signals transmitted over a time-dispersive transmission channel, comprising:
    a matched filter having an input and an output, said input for receiving signals transmitted over the transmission channel;
    a sampler connected to the output of said matched filter for sampling signals output by said matched filter to provide a sampled signal;
    a multiple stage serial-to-parallel shift register for receiving a series of said sampled signals and providing a parallel output thereof;
    a neural network having a number of neurons for receiving the parallel output of said shift register, said neural network having a number of outputs comprising the output of said receiver; and
    a coefficient estimator for receiving an estimated sequence output by said neural network and for receiving digital signals carried by said channel, and further including an output providing coefficient information coupled back to said neural network for modifying connection strengths of said network.

19. The receiver of claim 18 wherein said matched filter input defines a first input, and further including a second input connected to said coefficient estimator so that said matched filter is provided with coefficient information representing characteristics of the transmission channel.

20. The receiver of claim 18 further including a multiplier circuit for multiplying the digital output of said shift register.

21. The receiver of claim 20 wherein said multiplier circuit comprises a multiply by two circuit.

22. The receiver of claim 18 further including means connected to the input of said neural network for preconditioning the output of said neural network to desired states.

23. The receiver of claim 22 further including means for activating said preconditioning means periodically in association with different inputs to said neural network.

24. The receiver of claim 18 further including a thresholding device connected between the output of said neural network and the input of said coefficient estimator for providing bipolar signals to said coefficient estimator.

25. The receiver of claim 18 wherein said neural network comprises a connection matrix interconnecting a plurality of analog amplifiers.

26. The receiver of claim 25 further including means in said coefficient estimator for producing neural network coefficients based upon time varying characteristics of said transmission channel, and means for changing interconnection strengths of said neural network connection matrix based upon said coefficients.

27. The receiver of claim 26 wherein said means for changing comprises an adder and a negation circuit for adding a number to said coefficients and for changing the resultant sign thereof.

28. A method of processing signals received over a digital transmission channel using maximum-likelihood sequence estimation techniques, comprising the steps of:
coupling the signals through a filter adapter for matching to the transmission channel;
converting the signals to digital signals; and
presenting the digital signals to a neural network to provide a high-speed output estimation of the signals initially transmitted of the transmission channel.

29. The method of claim 28 further including producing feedback coefficients using the output of said neural network; and
coupling the coefficients back to said neural network for changing connection strengths in said neural network.

30. The method of claim 28 further including presenting the digital signals to said neural network in parallel.

31. The method of claim 28 further including coupling the digital signals to said neural network in groups of said digital signals, wherein ones of said digital signals in each said group are common and thus overlapped in time.

32. The method of claim 31 further including presetting said neural network before each group of a plurality of groups of digital signals are coupled to said neural network.

33. The method of claim 28 further including presetting said neural network to predetermined states before the coupling of the digital signals thereto.

34. The method of claim 28 further including multiplying the digital signals by a predetermined factor before coupling the signals to said neural network.

35. The method of claim 28 further including providing said neural network with a connection matrix for interconnecting neurons of said neural network with desired strengths, and changing the strengths of said connection matrix when predetermined electrical characteristics of said transmission channel change to thereby provide an adaptive receiver for time varying transmission channels.

36. The method of claim 35 further including changing said interconnection strengths based upon said coefficients.

37. The method of claim 36 further including applying a signal to said connection matrix formed by adding said coefficients to produce a sum and negating said sum.

38. The method of claim 28 further including coupling said digital signals to said neural network having a plurality of analog amplifiers, and processing outputs of said amplifiers to produce bipolar states.

39. The method of claim 28 further including processing the digital signals so as to minimize the function $$J(\{a_n\}) = -\sum_{i=1}^{M} 2a_i z_i + \sum_{i=1}^{M}\sum_{k=1}^{M} a_i s_{i-k} a_k$$

where $a_i$ are the signals transmitted, $z_i$ are sampled output of the filter, and $s_k$ are the coefficients for the estimation.

* * * * *